United States Patent [19]

Hamster et al.

[11] Patent Number: 4,536,642
[45] Date of Patent: Aug. 20, 1985

[54] DEVICE FOR TREATING GASES AT HIGH TEMPERATURES

[75] Inventors: Helmüt Hamster, Burghausen; Franz Köppl, Altötting, both of Fed. Rep. of Germany

[73] Assignee: Wacker-Chemitronic Gesellschaft fur Elektronik-Grundstoffe m.b.H., Burghausen, Fed. Rep. of Germany

[21] Appl. No.: 513,298

[22] Filed: Jul. 13, 1983

Related U.S. Application Data

[63] Continuation of Ser. No. 268,967, Jun. 1, 1981.

[30] Foreign Application Priority Data

Jun. 27, 1980 [DE] Fed. Rep. of Germany ....... 3024320

[51] Int. Cl.³ .............................. F24H 3/00; H05B 3/02
[52] U.S. Cl. ...................................... 219/374; 219/367; 219/381; 219/382; 219/375
[58] Field of Search .............. 219/374, 367, 368, 381, 219/382, 375

[56] References Cited

U.S. PATENT DOCUMENTS 2,145,084  1/1939  Hersey ................................. 257/233
3,497,674  2/1970  Zirngibl et al. ...................... 219/381
3,541,304  11/1970  Cohn .................................... 219/374

FOREIGN PATENT DOCUMENTS 574942   4/1933  Fed. Rep. of Germany .
1081426  5/1960  Fed. Rep. of Germany .

OTHER PUBLICATIONS

"Electrotechnische Grundlagen", pp. 4-7.

Primary Examiner—Roy N. Envall, Jr.
Assistant Examiner—M. M. Lateef
Attorney, Agent, or Firm—Collard, Roe & Galgano

[57] ABSTRACT

A device is provided for treating gases or mixtures of gases at high temperatures, such as, for example, for the reaction, known as tetraconversion, of silicon tetrachloride with hydrogen to form trichlorosilane. The device has a heat-insulated housing having gas-inlet and gas-outlet openings and a plurality of resistance heaters disposed in the housing that are directly electrically heated and around or through which the gases to be treated flow. According to a preferred embodiment, the device is also provided with an integrated heat-exchanger unit.

3 Claims, 8 Drawing Figures

DEVICE FOR TREATING GASES AT HIGH TEMPERATURES

This application is a continuation of application Ser. No. 268,967 filed June 1, 1981.

The invention relates to a device for treating gases at high temperatures.

In the conventional manufacture of trichlorosilane from metallurgical-grade silicon and hydrogen chloride, large quantities of silicon tetrachloride, which is not suitable for the manufacture of high-purity silicon by reduction with hydrogen, are also produced. If, as is generally the case, trichlorosilane is used for this reduction, the reaction still does not proceed at all quantitatively; on the contrary, a large part of the trichlorosilane is converted to silicon tetrachloride, for example, according to the following equation: $3SiHCl_3 + H_2 \rightarrow Si + SiHCl_3 + SiCl_4 + 2HCl + H_2$. According to this equation, approximately one-third of the trichlorosilane used is converted to silicon tetrachloride (cf., U.S. Pat. No. 3,933,985). According to a number of processes, the silicon tetrachloride produced is reacted with hydrogen, with varying degrees of success, at temperatures above 900° C., to form trichlorosilane.

The problem of the invention was therefore to provide an optimum device for carrying out high-temperature gas reactions such as those mentioned above.

This problem is solved according to the invention by a device which comprises a heat-insulated housing having gas-inlet and gas-outlet openings and inert resistance heaters that are heated by the direct passage of an electrical current and are arranged between the openings.

The surface of the resistance heaters, which surfaces are heated by the passage of an electric current, bound or occupy spaces through which the gases that are to be heated flow. The geometric arrangement of the, e.g., tube-shaped, rod-shaped, block-shaped or lamella-shaped resistance heaters in the housing ensures that the total amount of gas in the housing reaches the desired temperature before it is discharged from the heat-insulated housing, and optionally after a reaction and after passing through a heat-exchanger unit that is also preferably installed in the housing.

When heating or reacting gases or mixtures of gases that do not react with carbon, that material, especially graphite, is particularly suitable for the manufacture of the resistance heaters. If the heat exchangers are not in the form of rods or blocks, they can be particularly readily manufactured from graphite foil which, according to information provided by the manufacturers, may be made, e.g., from pure high-grade graphite, with the spaces between the layers in the crystal lattice of the graphite having been increased, by means of chemical and thermal treatment, to a multiple of the normal value of 3.35 Å. The resulting material, which is of low bulk density and consists of vermiform component parts, is then compressed on calenders or presses to produce the end product in which the layers of the graphite lattice and the individual particles of the bulk material are firmly bound together again, soley by the application of mechanical pressure. Such graphite foil, which can be obtained in various thichnesses, can be processed extremely easily and it is also inexpensive. It can be cut with ordinary household scissors, can be bent as desired, and can be bonded with commercial carbon adhesives. The carbon adhesives used are preferably those which leave only carbon as a solid residue at the high temperatures used.

The resistance heaters may advantageously be in the form of, e.g., interconnected forced-flow tubes or cylinders terminating in an electrically-conductive collecting vessel that leads to the gas outlet or, alternately, they may be in the form of rods or non-forced-flow tubes that are interconnected by means of a graphite ring and are arranged inside and/or outside one or more graphite cylinders, by means of which the energy transmission is used in an optimum manner as a result of heat radiation. In the latter embodiment, the removal of the gases is effected, for example, via a centrally arranged graphite tube, the upper end of which widens in the form of a funnel and thus covers the whole heating arrangement, and the lower end of which has a means of entry for the gas into the inside of the tube.

The electrically conductive resistance bodies are preferably heated by means of a star connection in a balanced multiple-phase alternating current system, the mid-point of the star connection being formed, in the case of the embodiments given as examples above, by the collecting vessel or the ring that connects the heating elements. Because of this preferred connection, electrically insulating parts are unnecessary in the interior of the arrangement. This is particularly advantageous since insulators suitable for operation at such high temperatures, especially those that do not lead to contamination of the gases to be treated in the receiver, are difficult to find.

A further advantage of this type of connection in the case of the first-mentioned embodiment is that as many resistance heaters as desired can terminate in a collecting vessel since, as is known, the same mid-point can be used for various star-connected multiple-phase systems. The advantageous result is that individual heater groups can be individually controlled, i.e., they can be heated to different extents by the passage of an electric current. This is advantageous since, in general, the electrically conductive resistance bodies arranged on the periphery of the receiver naturally radiate more energy than those arranged in the center which are themselves irradiated by the adjacent resistance heaters.

Even in the case of the second embodiment, however, which is described by way of example, the star connection of the resistance heaters, which are arranged as tubes or rods, is not dispensed with since, if contact were made between the side of the heater and the wall of the housing as a result of a displacement or the like, it would not result in a short circuit. In principle, of course, it is also possible to use electrically heated resistance heaters that are connected, for example, in pairs and that are operated on a single phase alternating current or a direct current, since there is no direct contact between the electrically charged parts and the other components of the device inside the arrangement.

The outer wall of the housing is normally advantageously a pressure-resistant metal shell of, e.g., refined steel and, depending on the intended use, it may be advantageous to provide cooling, e.g., by means of an arrangement having double-walls through which a coolant can flow.

The interior of the receiver is advantageously provided with suitable heat insulation in order to minimize energy losses as much as possible. Suitable material for this purpose are heat-resistant materials that are inert to the gases to be treated, such as e.g., aluminum oxide, wool or graphite felt. The inside of the insulation means is advantageously covered with radiation sheet metal or graphite foil. As a result, energy losses can be largely eliminated by the exchange of radiation with the resistance heaters and thus a uniform temperature is ensured in the individual resistance heaters.

In cases where gases are to be reacted at high temperatures and the reaction products are also in a gaseous form, i.g., when the reaction can take place in the device according to the invention itself, as in the case of the tetraconversion described in the introduction, it is advisable that the gases or mixtures of gases to be reacted and, therefore, to be heated, be preheated in a heat exchanger by the reaction gases which are still hot.

According to a preferred embodiment of the present invention, this heat-exchanger unit is integrated into the device according to the invention and is advantageously installed between the arrangement of inert resistance heaters heated by the direct passage of a current and the gas-outlet opening.

This heat-exchanger unit may consist, for example, of a set of unheated graphite tubes which act as a gas-outlet and around the outside of which fresh gas circulates in a countercurrent manner. Alternatively, it may consist of one or more crosscurrent heat-exchanger blocks which have a large number of drilled holes for the gases that are to be removed and those that are to be freshly introduced.

The device according to the invention is not, of course, limited to use with the tetraconversion described in the introduction but is basically suitable for carrying out high-temperature reactions of gaseous reactants and may also be used purely for heating gases.

Other objects and features of the present invention will become apparent from the following detailed description when taken in connection with the accompanying drawings which disclose several embodiments of the invention. It is to be understood that the drawings are designed for the purpose of illustration only and are not intended as a definition of the limits of the invention.

In the drawings, wherein similar reference characters denote similar elements throughout the several views.

Figure 1:
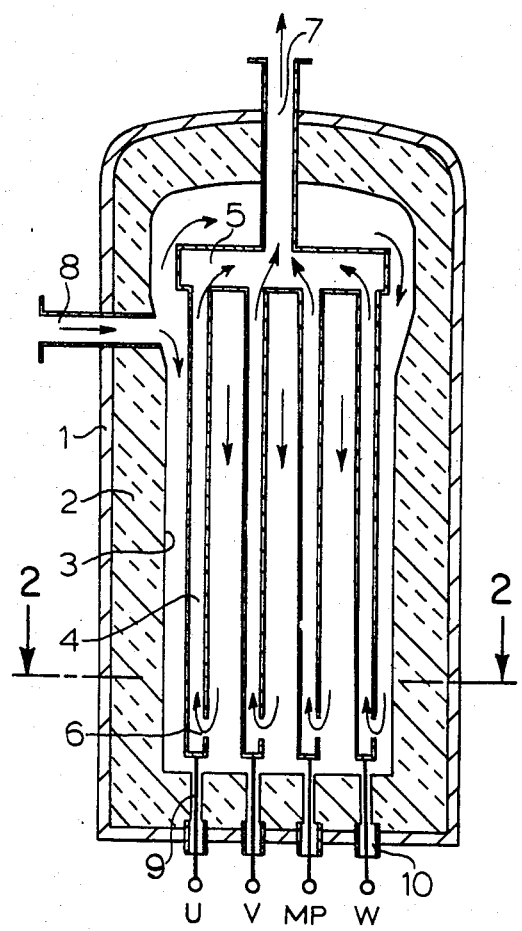
FIG. 1 is a longitudinal cross-sectional view of a device embodying the present invention having tube-shaped, forced-flow resistance heaters.
Figure 3A:
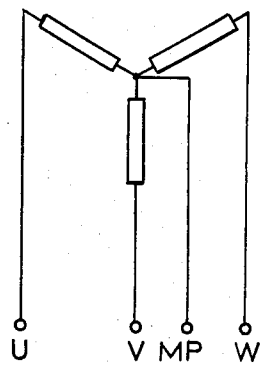
FIG. 3A is an electrical wiring diagram for the device of FIG. 3.
Figure 2:
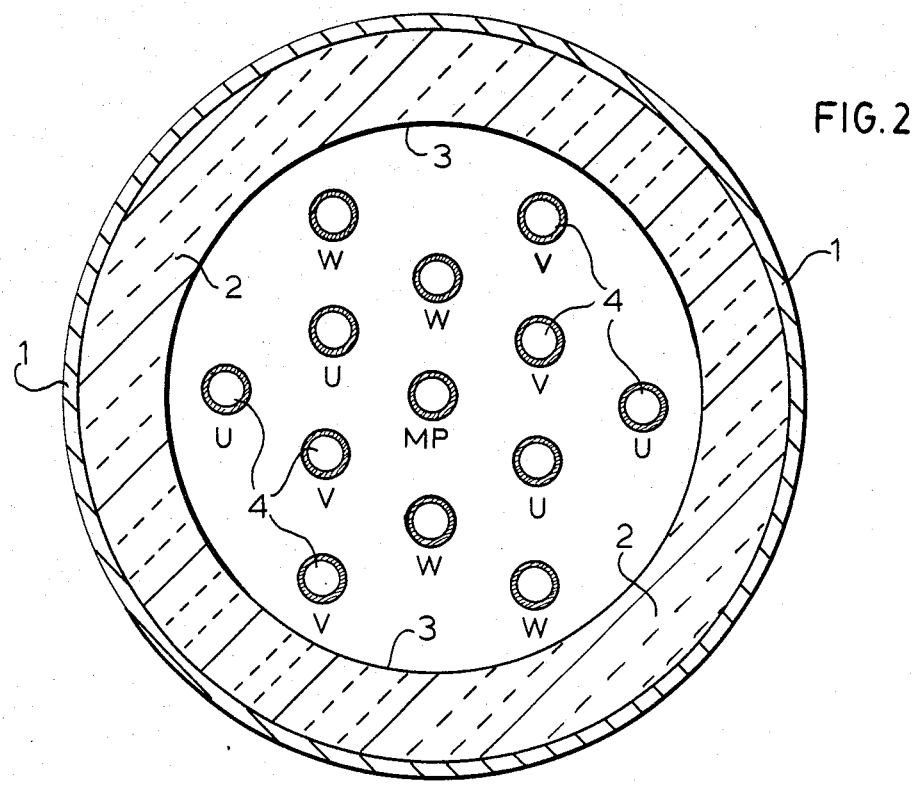
FIG. 2 is a transverse cross-sectional view of the device taken along line 2—2 of FIG. 1.
Figure 5:
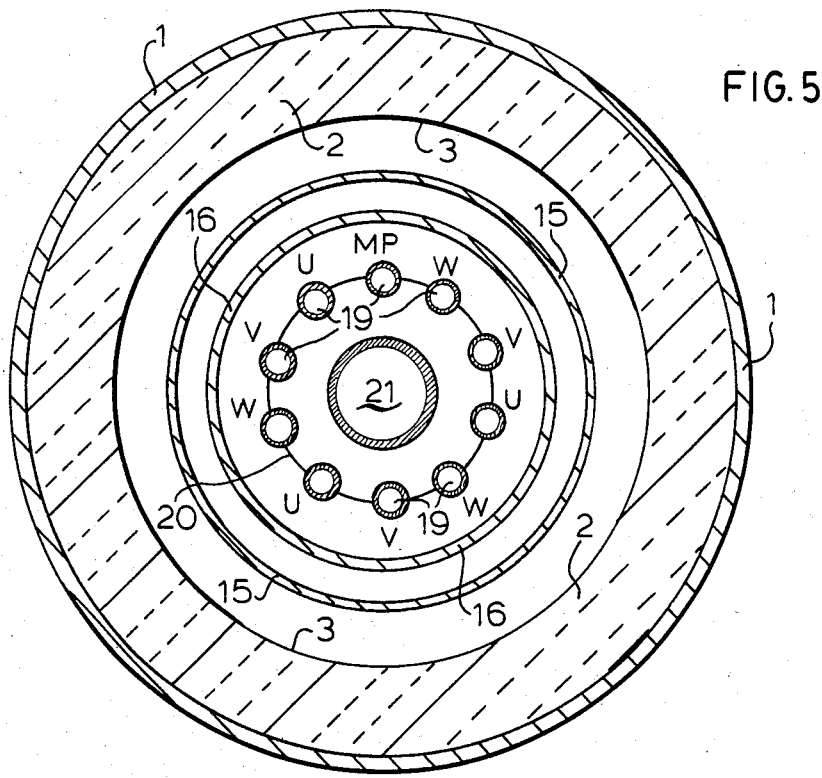
FIG. 5 is a transverse cross-sectional view of the device taken along line 5—5 of FIG. 4.
Figure 1A:
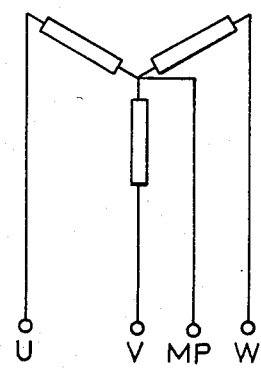
FIG. 1A is an electrical wiring diagram for the device of FIG. 1.

Referring now in detail to the drawings, and in particular FIG. 1 thereof, therein illustrated is a device embodying the present invention having a housing 1 made of, e.g., refined steel, which is lined with a layer 2 of heat-insulating material, such as, for example, graphite felt, having an inner covering of graphite foil 3. A plurality of graphite tubes 4 terminating in a collecting vessel 5, which is also of graphite, are arranged in housing 1. Graphite tubes 4 are provided with inlet openings 6 at their lower ends and collecting vessel 5 leads directly to an outlet opening 7. This arrangement brings about a forced flow of the gases or mixtures of gases, supplied to the reactor through an inlet opening 8. Heating tubes 4 are provided at their lower ends with electrical connections or leads 9, which leave housing 1 through openings 10, which are insulated from housing 1 and are star-connected in a balanced multiple-phase alternating current system; in this case, in a three-phase alternating current system (U, V, W,) with collecting vessel 5 acting as the mid-point. One tube is connected as the mid-point or neutral conductor (MP), although this is not absolutely necessary. The latter arrangement does not require any great expenditure and has the advantage that even in the unlikely event of, e.g., a tube bursting or developing some other defect and consequently destroying the balance of the connection, the voltage would nevertheless not be applied to the collecting vessel. The balanced arrangement of the heating tubes 4 of the three phases U, V and W, as well as the grounding at the mid-point (MP), is shown quite clearly in FIG. 2, which shows a suitable transverse cross section for the device according to FIG. 1.

Figure 3:
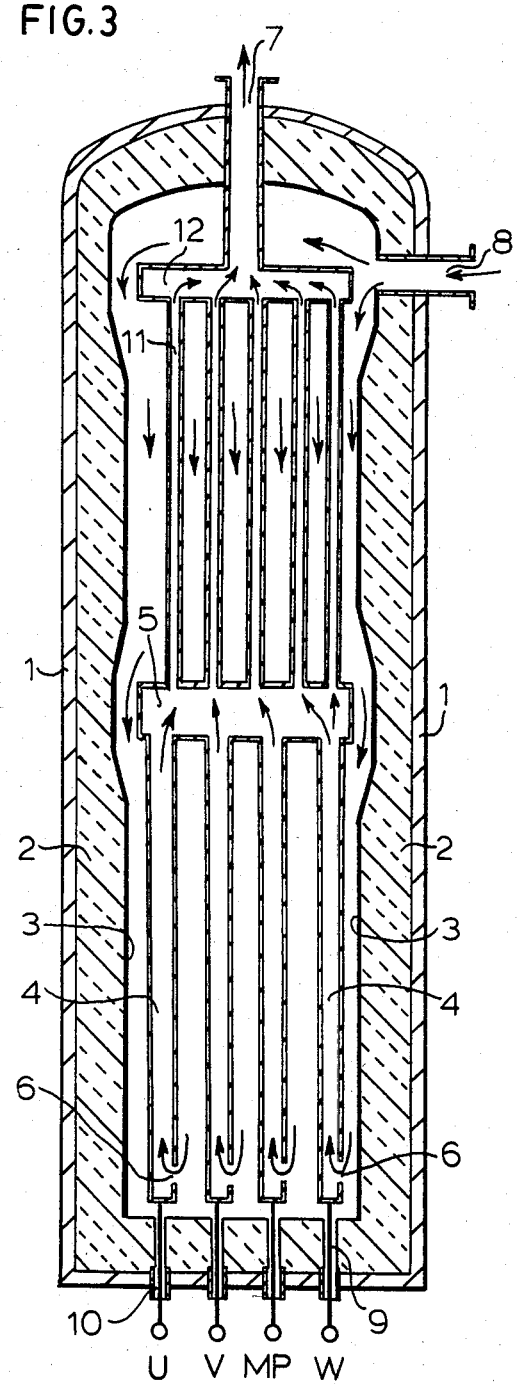
FIG. 3 is a longitudinal cross-sectional view of a device comparable to that of FIGS. 1 and 2, but additionally comprising an integrated heat-exchanger unit.

In FIG. 3, a housing 1 is provided, lengthened somewhat as compared with that shown in FIG. 1, which additionally comprises a heat-exchanger unit consisting of gas conduits which are arranged between collecting vessel 5 and the outlet opening 7. These gas conduits consist of unheated graphite tubes 11 which terminate in a second collecting vessel 12 and around the outside of which fresh gas, supplied through gas-inlet opening 8, can circulate.

Figure 4:
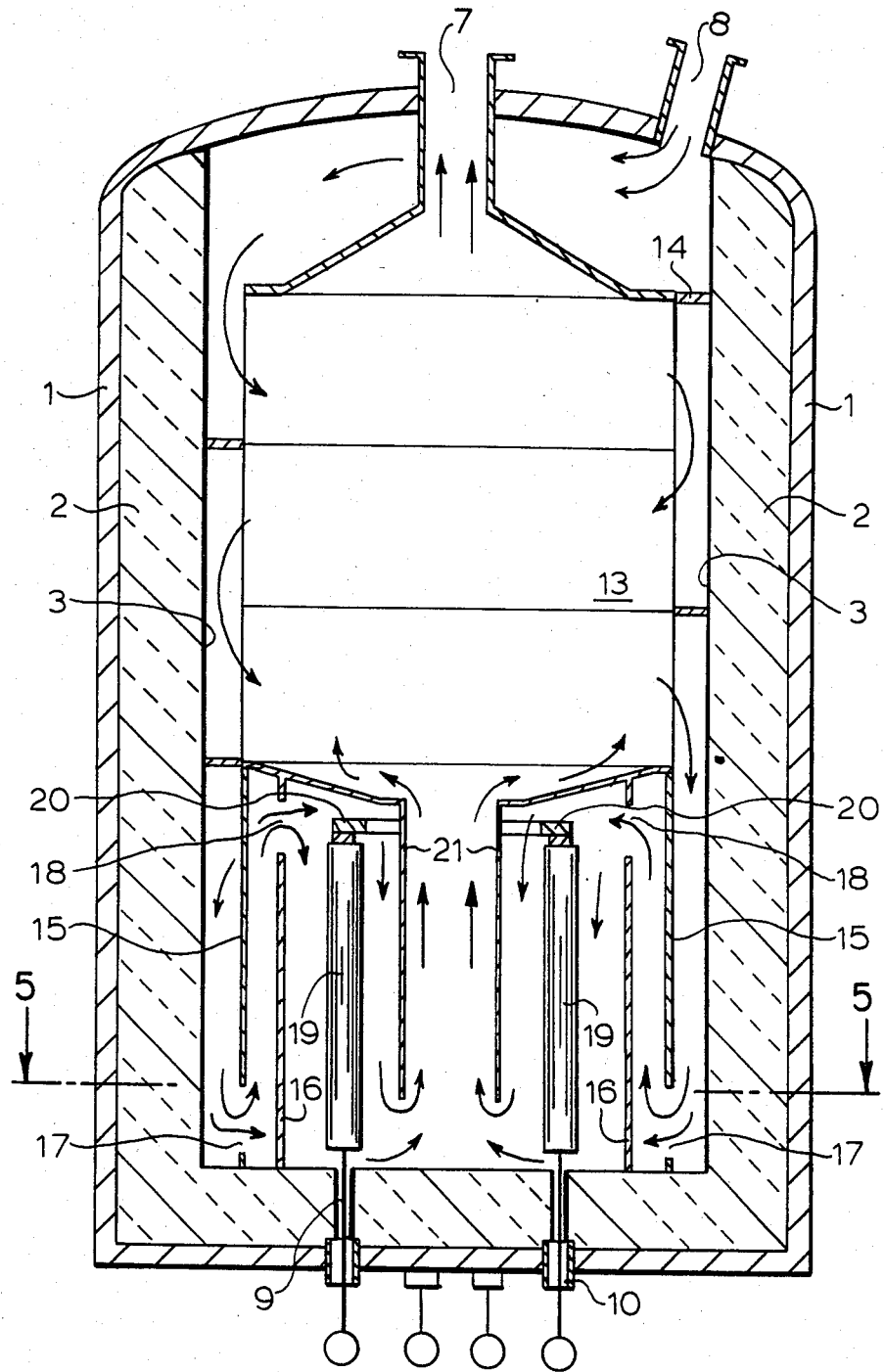
FIG. 4 is a longitudinal cross-sectional view of a further embodiment of the invention having non-forced-flow resistance heaters arranged around a central immersion tube, and additionally comprising a schematically intergrated heat-exchanger unit.
Figure 6:
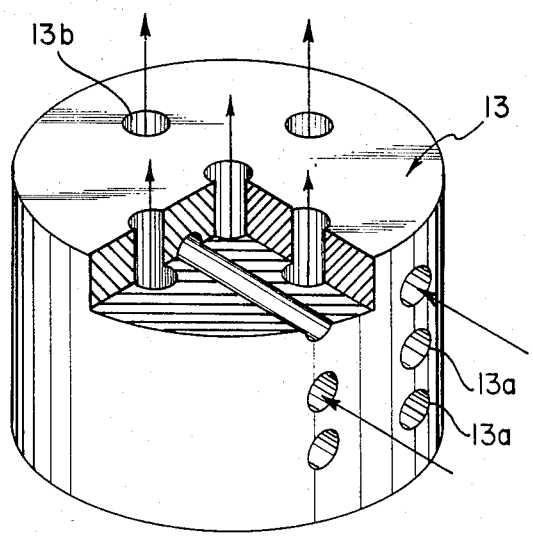
FIG. 6 is a perspective view of the heat exchanger shown schematically in FIG. 4, with portions broken away to show internal construction.

FIG. 4 shows a modified device comprising a heat-exchanger unit consisting of graphite blocks 13 through which the fresh gas entering at inlet 8 flows in a horizontal direction through appropriately arranged drill holes 13a and is forced to flow through all the heat-exchanger blocks in a serpentine fashion by means of the graphite barriers 14 located between the blocks and graphite foil 3 which acts as an inner covering for insulation 2. The preheated fresh gas flows through two graphite cylinders 15 and 16 which are arranged one inside the other and which have at their lower and upper portions, corresponding gas-passage openings 17 and 18, respectively. Heating tubes or rods 19 of graphite, through which the gas does not flow and which are electrically interconnected by a graphite ring 20, are arranged inside inner graphite cylinder 16. The electrical leads or connections 9 for the individual phases U, V and W, as well as for the neutral conductor MP, leave the housing through suitably insulated openings 10. In this case too, the individual rods are star-connected in a multiple-phase alternating current system in which the graphite ring described forms the mid-point of the system. The removal of the gases from this heating system takes place via a central graphite tube 21 which is funnel-shaped at its upper end. The heated and, optionally, reacted gases or mixtures of gases leave the device according to the invention through tube 21 and after passing through heat-exchanger blocks 13, via drill holes 13b through gas-outlet opening 7.

Thus, while only several embodiments of the present invention have been shown and described, it will be obvious that many changes and modifications may be made thereunto, without departing from the spirit and scope of the invention.

We claim:
1. A device for treating silicon-containing gases at high temperatures, comprising:
   a heat-insulated, generally hollow housing having a top wall, a sidewall, and a bottom plate defining a reaction chamber and gas-inlet and gas-outlet openings respectively leading into and from said housing; and
   a plurality of inert resistance heaters which are heatable by the direct passage of an electric current therethrough and which are arranged in a standing, generally upright manner in said housing spaced from said top wall and bottom plate thereof such that they are arranged between said top wall and bottom plate in the general path of gases flowing between said openings so as to have direct contact therewith said gases, said standing resistance heaters terminating at their upper ends in an electrically conductive interconnection and each having at its lower end a separate lead leaving said housing through separate insulated openings in said bottom plate and terminating outside said reaction chamber and being star-connected in a balanced multiple-phase alternating current system.

2. The device according to claim 1, additionally including a pair of outer, concentric, forced-flow graphite cylinders which are arranged one inside the other and an inner concentric immersion tube which serves as the gas outlet opening which are disposed in said housing and between which said resistance heaters are arranged.

3. The device according to claim 1, additionally including a heat-exchanger unit comprising electrically-unheated gas conduits which are installed in said housing between said inert resistance heaters and said gas-outlet openings.

* * * * *

UNITED STATES PATENT AND TRADEMARK OFFICE
CERTIFICATE OF CORRECTION

PATENT NO. : 4,536,642
DATED : AUGUST 20, 1985
INVENTOR(S) : HELMUT HAMSTER ET AL

It is certified that error appears in the above—identified patent and that said Letters Patent are hereby corrected as shown below:

Cover page, item [75], insert names and addresses of third and fourth inventors, as such --Franz Schreieder, Tann, Fed Rep of Germany; and Rudolf Griesshammer, Burghausen, Fed Rep of Germany--.

Signed and Sealed this

Thirty-first Day of December 1985

[SEAL]

Attest:

Attesting Officer

DONALD J. QUIGG

Commissioner of Patents and Trademarks